United States Patent [19]

Rabinovich

[11] Patent Number: 5,231,686
[45] Date of Patent: Jul. 27, 1993

[54] OPTICAL CONNECTOR CONFIGURED TO FACILITATE ACTIVE ALIGNMENT OF A PHOTOELECTRIC DEVICE WITH AN OPTICAL FIBER

[75] Inventor: Simon M. Rabinovich, Collin County, Tex.

[73] Assignee: Honeywell Inc., Minneapolis, Minn.

[21] Appl. No.: 916,785

[22] Filed: Jul. 17, 1992

[51] Int. Cl.[5] .............................................. G02B 6/42
[52] U.S. Cl. ...................................... 385/93; 385/88; 385/92
[58] Field of Search .................. 385/88, 89, 90, 91, 385/92, 93, 94

[56] References Cited

U.S. PATENT DOCUMENTS

| | | | |
|---|---|---|---|
| 4,386,821 | 6/1983 | Simon et al. | 385/92 |
| 4,399,453 | 8/1983 | Berg et al. | 385/92 X |
| 4,775,211 | 10/1988 | Wondrazek et al. | 385/88 |
| 4,988,159 | 1/1991 | Turner et al. | 385/88 X |
| 4,989,930 | 2/1991 | Nakagawa | 385/93 X |
| 4,989,943 | 2/1991 | Yoshinaga et al. | 385/93 |
| 5,004,318 | 4/1991 | Ohashi | 385/89 X |
| 5,044,720 | 9/1991 | Haley et al. | 385/88 |
| 5,098,207 | 3/1992 | Blomgren | 385/17 |

Primary Examiner—John D. Lee
Assistant Examiner—Phan T. Heartney
Attorney, Agent, or Firm—William D. Lanyi

[57] ABSTRACT

An optoelectronic connector is provided which attaches an optical fiber to one portion of a base structure and provides a opening in which a photosensitive device or a light emitting device can be disposed. The device is movable within an opening of the base to permit active alignment between the photosensitive device and an optical fiber attached to the base of the connector. An alignment member is attached to the photosensitive device to facilitate its movement relative to the base during the act of alignment process. An adapter is disposed between the alignment member and the base to permit the alignment member to be rigidly and permanently attached to the base by resistance welding even though the materials of the alignment member and the base are incompatible with each other and not amenable for welding together. The adapter is attached to the base by connecting it in interference relation therewith.

17 Claims, 6 Drawing Sheets

OPTICAL CONNECTOR CONFIGURED TO FACILITATE ACTIVE ALIGNMENT OF A PHOTOELECTRIC DEVICE WITH AN OPTICAL FIBER

BACKGROUND OF THE INVENTION

1. Field of the Invention

The present invention relates generally to a device for connecting an optical fiber in optical communication with an optoelectronic device and, more specifically, to a connector which permits a photosensitive device or light emitting device to be actively aligned with an optical fiber and permanently fixed in the aligned relationship in a quick and reliable manner.

2. Description of the Prior Art

In the field of optoelectronics, many situations arise where light signals must be coupled to electronic signals. For example, when optical fibers are used in a communication system, light signals passing through the optical fiber must be converted to electronic signals for use by associated equipment.

When light signals are coupled to electronic signals, the optical fiber must be located at a predetermined position relative to either a photosensitive device or a light emitting diode. The degree of permissible misalignment depends on the requirements of each application. One particularly stringent application is the coupling of an optical fiber to a PIN diode in a communication system in which data is transferred at gigabit rates. If the end of an optical fiber is misaligned in relation to the PIN diode, two deleterious conditions can adversely affect the transfer of information between light signals passing through the optical fiber and electronic equipment connected in signal communication with the PIN diode. If a portion of the light traveling through the optical fiber does not fall on the PIN diode, the efficiency of the device is diminished and the potential for lost signals is increased. Although this problem can adversely affect the accuracy of the data transfer between the optical fiber and the photosensitive device, an even more serious problem can be caused by a misalignment between the core of the optical fiber and the PIN diode. Since the PIN diode is typically incorporated within a integrated circuit that comprises many other components, such as photodiodes, capacitors, preamplifier circuits and other components, light which does not fall on the PIN diode will likely fall on other portions of the substrate of the integrated circuit. When this occurs, extra carriers are produced in those portions of the substrate and those carriers eventually migrate to the doped regions of the PIN diode. The time between the incidence of light falling on the non-PIN diode portions of the device and the migration of carriers to the PIN diode represents a delay that can improperly cause an electronic signal to be generated by the PIN diode at a time when no light signal is actually incident on the diode. Therefore, a misaligned connector can reduce the intensity of the intended electronic signal when a light signal is present in the optical fiber and can create false electronic signals at a time when no light signal is present in the optical fiber. For these reasons, high speed data communications systems require precise alignment between the optical signal carriers and the electronic components connected in signal communication with them.

In devices of the type described above, it is typical to employ active alignment techniques during the manufacture of the connector. In other words, after the optical fiber is firmly attached to the connector, the photosensitive device is placed proximate its final intended position and the electronic signal provided by the photosensitive device in response to a light signal through the fiber is monitored as the device is moved relative to the end of the optical fiber. When the electronic output signals from the photosensitive device indicate a proper alignment with the optical fiber, it is determined that the photosensitive device is in its proper position relative to both the optical fiber and the connector body. When this proper position is achieved, the photosensitive device can be rigidly and permanently attached to the connector body.

In certain applications of optoelectronic connectors, it is advantageous to use a zinc cast body for the connector because of its relatively low cost in comparison to a connector body made of machined stainless steel. However, the housing structure of a photosensitive device comprising a PIN diode in this application is made of Kovar and any material that is weld-compatible for welding to Kovar is likely to be incompatible for welding to the zinc cast body. If the photosensitive device is attached to the connector body with an epoxy, the time that is necessary to permit the epoxy to cure also increases the probability that the actively aligned components will be inadvertently misaligned. The additional care necessary to prevent misalignment during the time when the epoxy is curing could significantly increase the overall cost of the device.

Many different types of optoelectronics packages are well known to those skilled in the art. For example, U.S. Pat. No. 4,989,930, which issued to Nakagawa et al on Feb. 5, 1991, discloses a package that includes an optical semiconductor, an electronic cooling element carrying the optical semiconductor and electrically connected to one of the terminals of the semiconductor, a pair of transmission lines having distributed constant characteristics and an airtight vessel housing the optical semiconductor, the cooling element and the transmission lines. A grounding line of the transmission lines is connected between the terminal of the optical semiconductor and an external ground terminal fixed at the vessel. A signal line of the transmission line is connected between the other terminal of the optical semiconductor and an external signal terminal, whereby the stray capacitance of the cooling element is shorted by the distributed constant grounding line.

U.S. Pat. No. 4,988,159, which issued to Turner et al on Jan. 29, 1991, discloses an optoelectronic transducer which is connected with a fiber optic tail by providing a casing around the transducer. The casing has a flat wall. In addition, a termination body is provided on the fiber with a thin wall flange. The optical axes are aligned and the flange is laser welded to the casing.

U.S. Pat. No. 5,004,318, which issued to Ohashi on Apr. 2, 1991, describes an optical fiber switch that comprises a casing, a plurality of optical fibers attached to the casing and a vertically movable member that is disposed facing the ends of the optical fibers. The movable member is provided with a resilient portion provided at one end. A member, which is deformed to be contracted by supplying an electric power, is provided at the other end. The resilient portion can comprise a shaped memory alloy or a bimetal and is deformed to be contracted for causing the movable member to move vertically. The movable member can also comprise a plate that has an aperture for transmitting a light beam.

SUMMARY OF THE INVENTION

An optically aligned connector made in accordance with a preferred embodiment of the present invention comprises a base that has a first portion and a second portion. The first portion is shaped to receive an end portion of an optical fiber at a fixed position therein and aligned with a predetermined axis. The second portion has a first opening in a first surface thereof. The opening and the first portion are on an opposite side of the base from the second portion. An adapter having a first plate portion is disposed in parallel association with the first surface and is firmly attached to the second portion. A preferred embodiment of the present invention also comprises an alignment member having a second plate portion with a second opening therethrough. In addition, a photoelectric device is rigidly attached to the alignment member and is disposed in the second opening. The alignment member is attached to the adapter with the photoelectric device being disposed at a prealigned position relative to the axis with which the optical fiber has been aligned.

In one particular embodiment of the present invention, the photoelectric device comprises a PIN diode and the base is made of a cast zinc material. Also, a particularly preferred embodiment of the present invention includes an adapter that comprises a cylindrical element extending from the first plate portion with the cylindrical element being shaped to be received in interfering relation within the first opening of the base. The cylindrical element is shaped to receive the photoelectric device in clearance relation therein. In one embodiment of the present invention, the adapter is made of Kovar and a portion of the alignment member comprises an extension member which is attached in frangible association with the alignment member for the purpose of permitting automated machinery to hold and selectively move the alignment member in relation to the base during the active alignment procedure.

BRIEF DESCRIPTION OF THE DRAWINGS

The present invention will be more fully understood by reading the description of the preferred embodiment in conjunction with the drawing, in which.

DESCRIPTION OF THE PREFERRED EMBODIMENT

Figure 1:
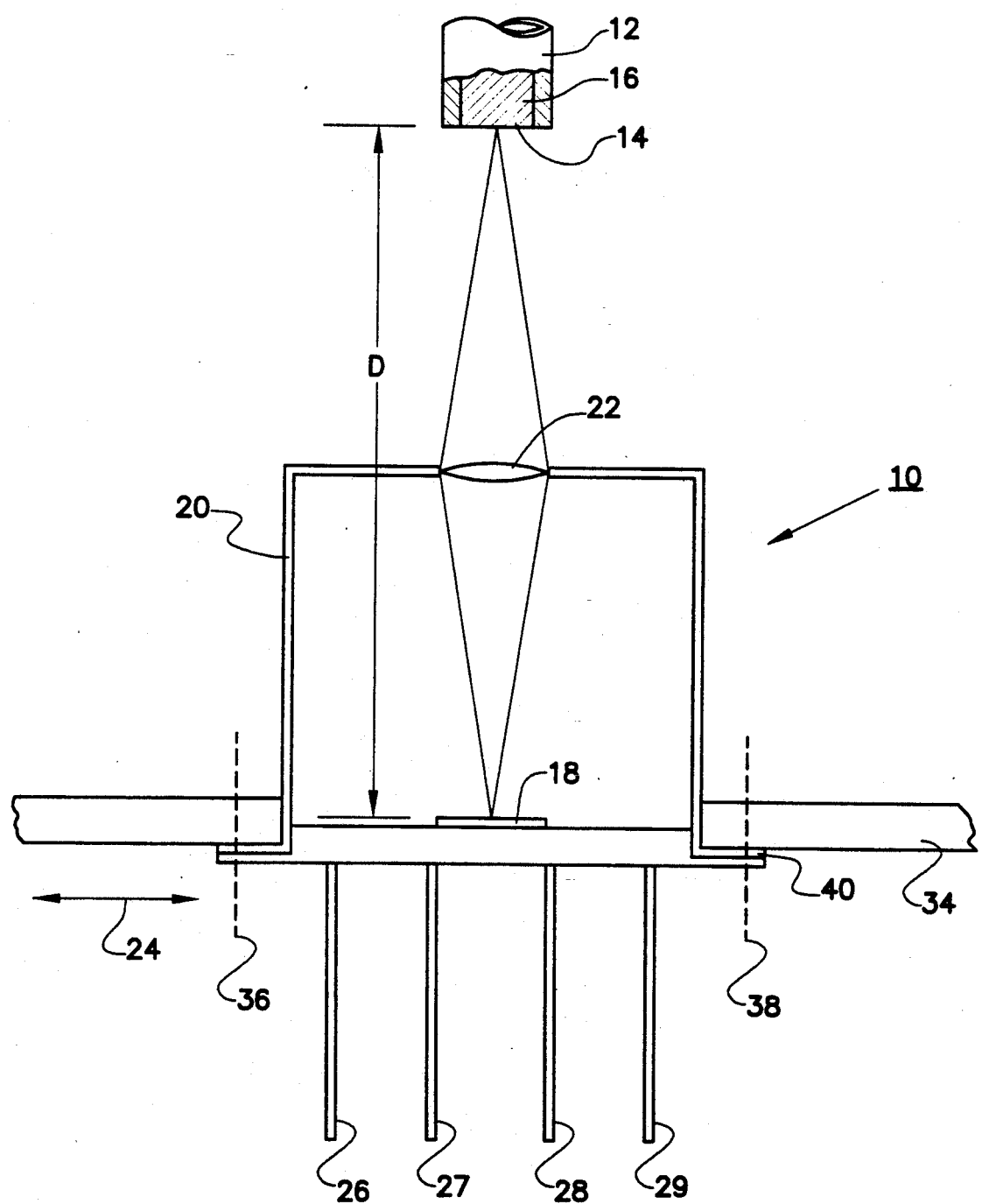
FIG. 1 is a schematic representation of a photosensitive device spaced apart from an optical fiber.

Throughout the description of the preferred embodiment of the present invention, like components and elements will be identified with like reference numerals.

FIG. 1 is a schematic illustration of a photosensitive device 10 spaced apart from an end of an optical fiber 12 for the purpose of describing the need for proper alignment between the optical fiber 12 and the photosensitive device 10. In the particular arrangement shown in FIG. 1, the optical fiber 12 carries light signals that are emitted from the end 14 of the fiber core 16 in a direction toward a component located within the photosensitive device 10. Although it should be understood that the present invention can be used in conjunction with either a photosensitive device or a light emitting device for the purpose of coupling light signals to electronic signals, one particular embodiment of the present invention incorporates a photosensitive device 10 that comprises a PIN diode within an integrated circuit 18. The integrated circuit 18 is disposed within a protective housing 20 of the photosensitive device 10. A lens 22 is appropriately located to permit light passage from the end 14 of the optical fiber 12 to the region of the integrated circuit 18 where the PIN diode is located.

As the light exits the end 14 of the core 16, it is diverging as shown. The lens 22 converges the light onto the PIN diode. For the reasons described above, it is necessary to appropriately align the optical fiber 12 with respect to the photosensitive device 10 to avoid the situation where light from the optical fiber falls on portions of the integrated circuit 18 other than the location of the PIN diode. To achieve proper alignment, the photosensitive device 10 is generally moved in the directions indicated by arrow 24 and in directions perpendicular to both arrow 24 and to the drawing of FIG. 1.. The dimension identified as D in FIG. 1 is also important to the proper operation of the photosensitive device 10, but is generally maintained by appropriate dimensioning of components within the connector that are attached in contact with each other. The leads 26-29 are used to connect the components of the integrated circuit 18 in signal communication with external devices.

As will be described in greater detail below, the housing 20 of the photosensitive device 10 is shown attached to an alignment member 34 at the locations where dashed lines 36 and 38 intersect the coplaner association of the rim portion 40 of the housing 20 and the lower surface of the alignment member 34. This attachment can be accomplished by a resistance weld at one or more locations around the housing where the rim portion 40 overlaps the lower surface of the alignment member 34. The alignment member 34 permits the photosensitive device 10 to be handled and manipulated during the active alignment process.

Figure 2:
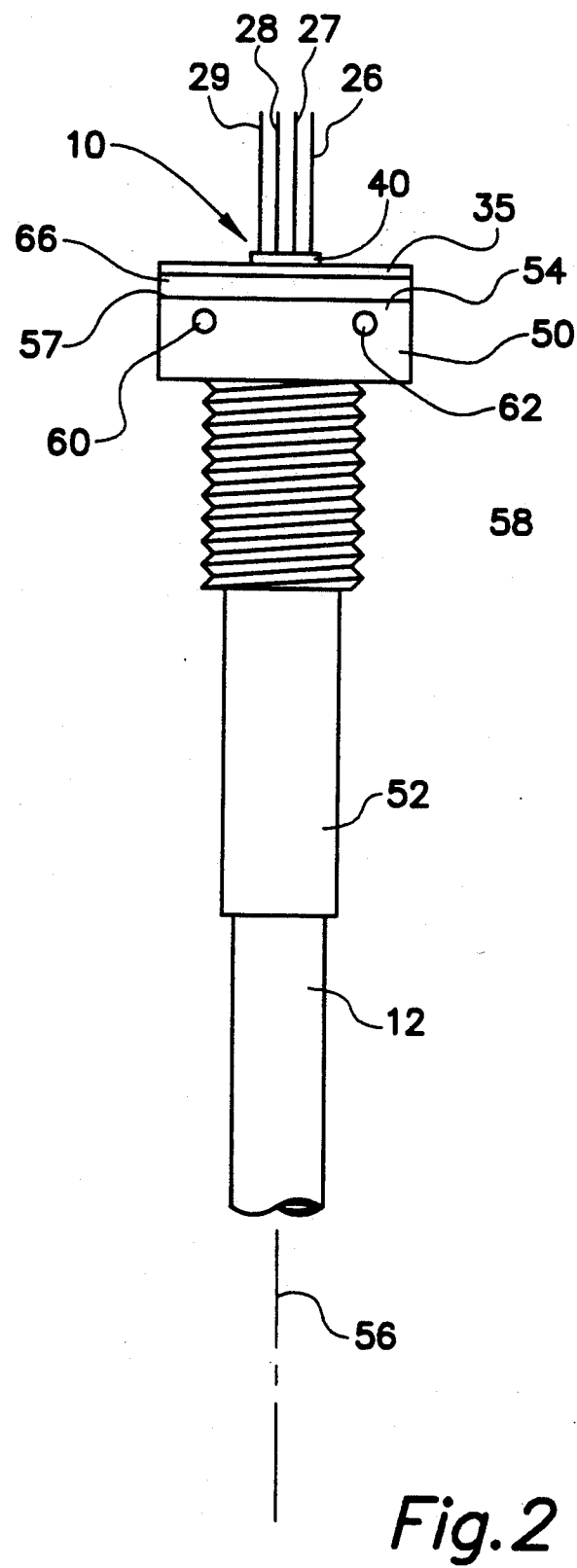
FIG. 2 illustrates a preferred embodiment of the present invention.

FIG. 2 shows a preferred embodiment of the present invention. The photosensitive device 10 is attached to a portion 35 of the alignment member 34 described above. A base 50 has a first portion 52 and a second portion 54. The first portion 52 is shaped to receive an end of an optical fiber 12 at a fixed position therein. The optical fiber 12 is aligned by the first portion 52 with a predetermined axis 56. The second portion 54 of the base 50 has a first opening (not illustrated in FIG. 2) in a first surface 57 thereof. The opening, which is identified by reference numeral 90 below in conjunction with FIG. 4, is formed in the first surface 57.

With continued reference to FIG. 2, it can be seen that a portion 58 of the base is threaded to facilitate its attachment to an external device. For these same purposes, the base 50 is also provided with threaded holes, 60 and 62. An adapter plate 66 has a first plate portion disposed in parallel association with the first surface 57 of the base. The adapter 66 is firmly attached to the second portion 54 of the base.

Figure 3:
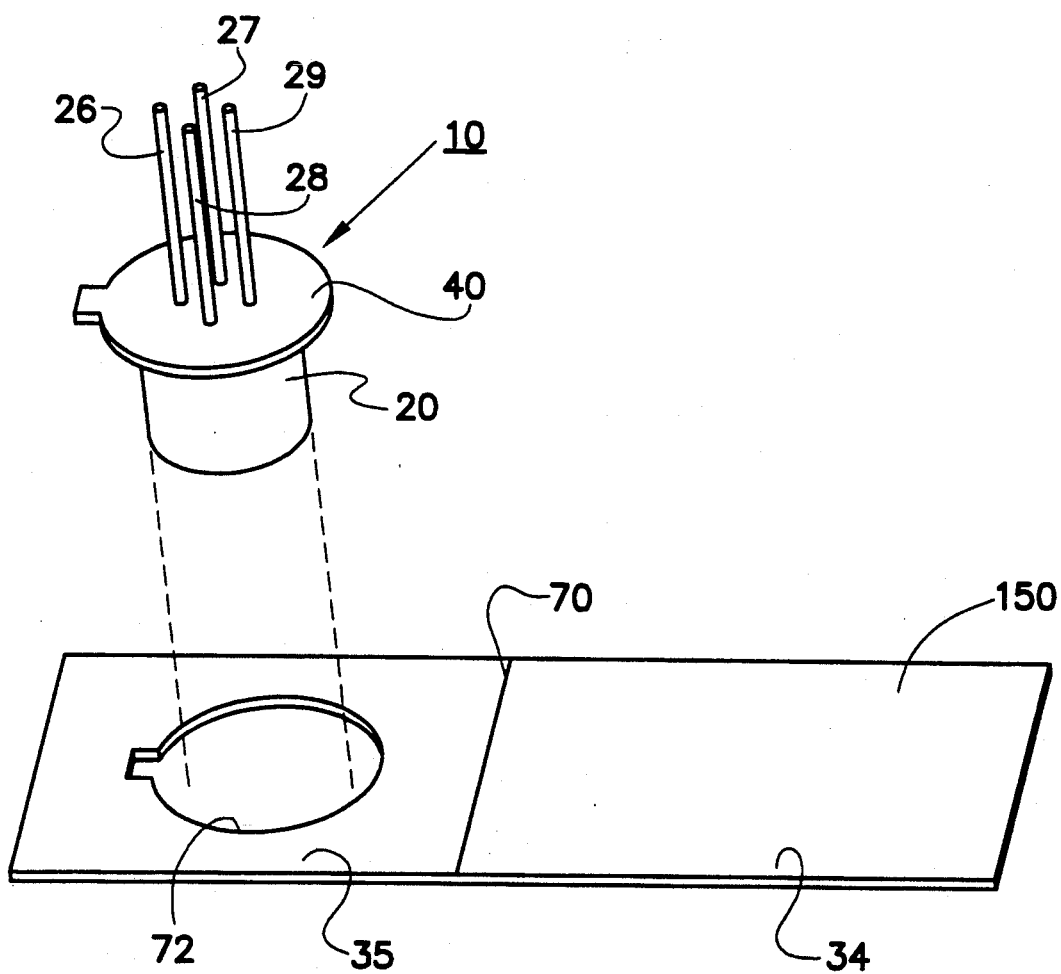
FIG. 3 is an exploded view of a photosensitive device and an alignment member.

FIG. 3 is an exploded illustration of the components described above in conjunction with FIGS. 1 and 2. The alignment member 34 comprises a portion 35 which is frangibly attached, along parking line 70, to an extension portion 150 that permits the alignment member 34 to be manipulated automatically by active alignment and welding machinery. After the active alignment procedure is complete and the present invention is permanently configured, the extension portion 150 of the alignment member 34 can be removed by breaking the device at line 70 with the portion 35 of the alignment member remaining in permanent contact with the base 50. An opening 72 is provided in the alignment member 34 to receive the photosensitive device 10. As can be seen, the opening 72 is sized to permit a portion of the housing 20 to pass therethrough while providing a surface at which the rim portion 40 can be resistance welded to the alignment member 34. In a preferred embodiment of the present invention, the alignment member 34 is made of either Kovar or stainless steel. Since the housing 20 of the photosensitive device 10 is also made of Kovar in a preferred embodiment of the present invention, welding compatibility between the photosensitive device housing and the alignment member is assured.

Figure 4:
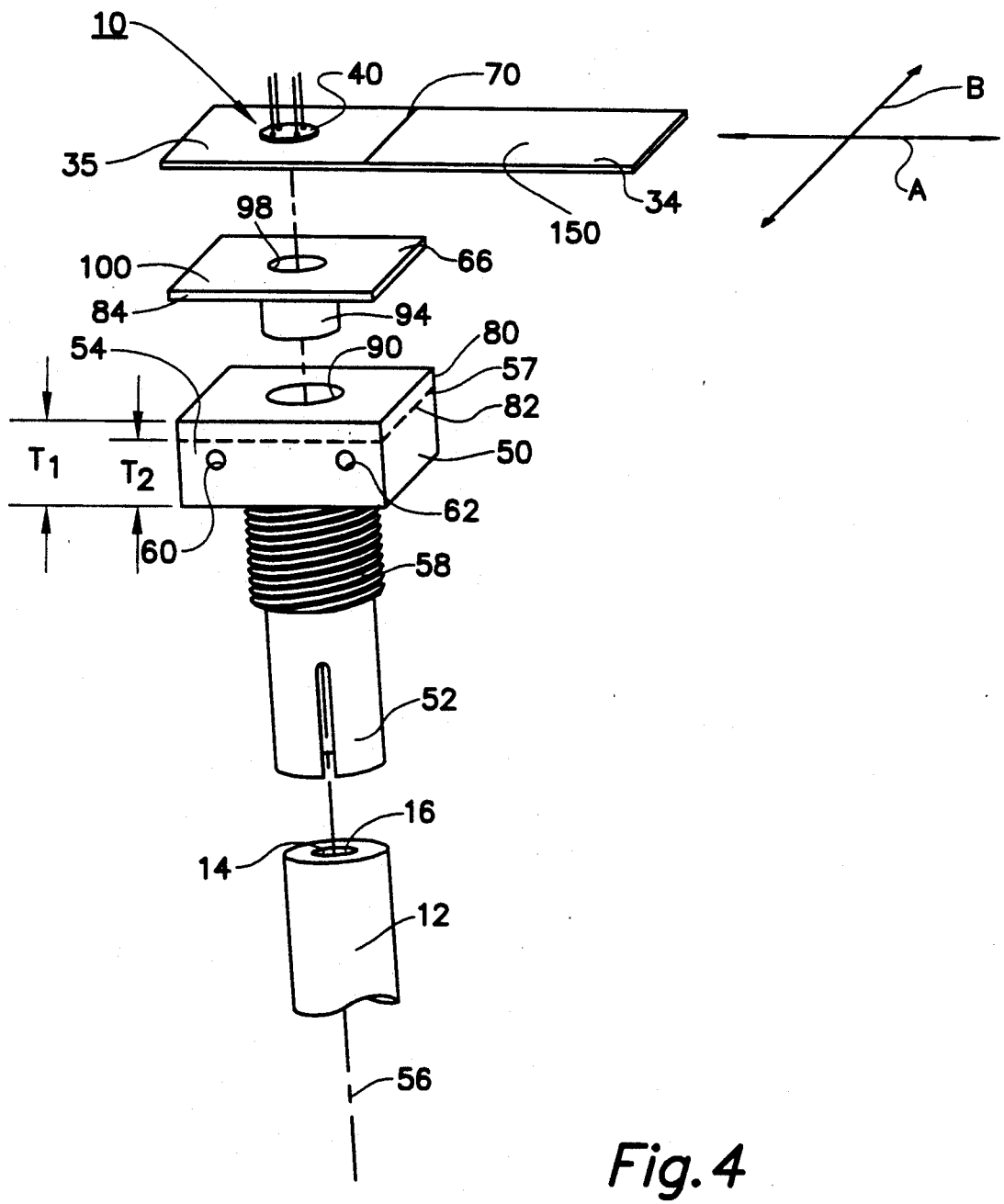
FIG. 4 is an exploded perspective illustration of a preferred embodiment of the present invention.

FIG. 4 is an exploded perspective view of exemplary elements of the present invention. The base 50 is a cast zinc component in a most preferred embodiment of the present invention. For the reasons which will be described in greater detail below, the upper portion 80 of the base 50 is removed to reduce the thickness of the base 50 from that identified as T1 to that identified as T2, further illustrated by dashed line 82. The purpose for this reduction in size of the base is to permit the adapter 66 to be disposed on the first surface 57 without adversely enlarging the overall height of the assembled structure. In other words, the difference in thickness between T1 and T2 is generally equal to the thickness of the first plate portion 84 of the adapter 66.

The first surface 57 of the second portion 54 is shaped to have an opening 90 therein. The opening 90 is shaped to receive a cylindrical portion 94 of the adapter 66 in interference relation therein. By pressing the cylindrical portion 94 into opening 90, a rigid attachment between the adapter 66 and the base 50 can be achieved.

When the adapter 66 is attached to the base 50 in this manner, the overall thickness of the base 50 and the first plate portion 84 is generally equal to dimension T1 because of the generally equal thicknesses of the first plate portion 84 and the upper portion 80 of the base 50 that had been removed prior to the assembly procedure.

The adapter 66 has a second opening 98 formed therein and through the cylindrical portion 94. The second opening 98 is shaped to receive the housing 20 of the photosensitive device 10 in clearance relation therein. When the alignment member 34 is disposed in coplaner and contact relation with the upper surface 100 of the adapter 66, it can be moved in the directions indicated by arrows A and B in FIG. 4. If the alignment member 34 is disposed in coplaner and contact relation with the upper surface 100, the overall vertical dimension between the PIN diode within the photosensitive device 10 and the end surface of the core 16 of the optical fiber 12 will be maintained at a proper dimension because of the appropriate sizing of the thicknesses of the elements shown in FIG. 4. Movement of the alignment member 34 in the directions of arrows A and B permit the proper alignment of the PIN diode with axis 56.

Figure 5A:
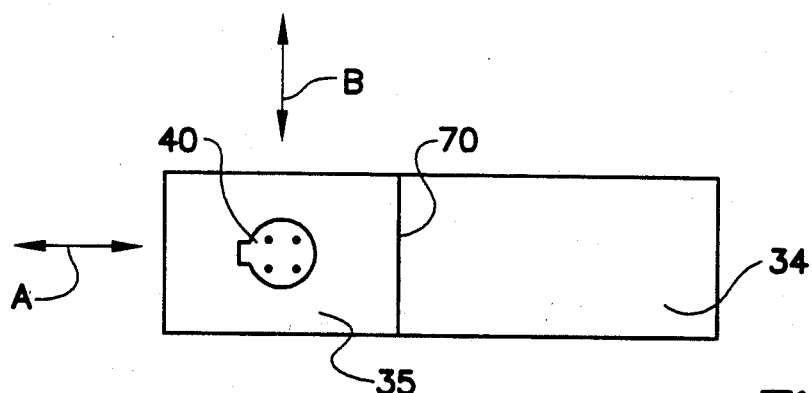
FIGS. 5A and 5B show a top view and a side section view of a preferred embodiment of the present invention.
Figure 5B:
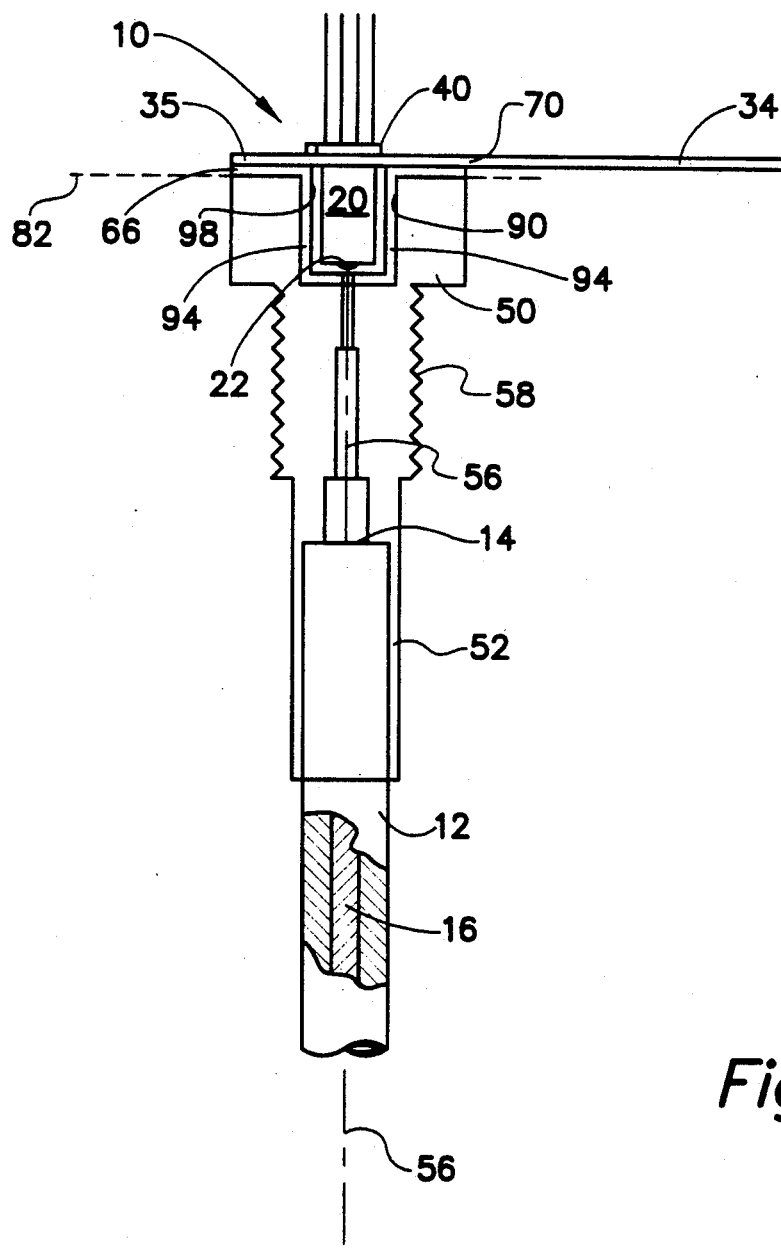

FIGS. 5A and 5B show the top view and side sectioned view, respectively, of a preferred embodiment of the present invention. As the alignment member 34 is moved back and forth in the directions identified by arrows A and B, the position of the lens 22 is moved relative to axis 56. If the photosensitive device 10 is electrically connected to a means for determining the strength of the optic signal received by the PIN diode, the alignment member 34 can be moved in directions which optimize the signal and ensure proper alignment of the PIN diode with axis 56. Since the opening 98 in the cylindrical portion 94 of the adapter is shaped to receive the housing 20 in clearance relation therein, movement of the housing within opening 98 is permitted as the alignment member 34 is moved to adjust the position of lens 22 in relation to axis 56. When proper alignment is achieved, light passing through the core 16 of optical fiber 12 can exit the end surface 14 and pass along axis 56 toward lens 22. Lens 22 then serves the function of focusing the diverging light to the specific position of the PIN diode within the integrated circuit 18 described above.

Once proper alignment is achieved, it is necessary to permanently fix the location of the photosensitive device 10 in relation to the end surface 14 of core 16. Since the optical fiber 12 is rigidly attached by the first portion 52 to the base 50, it is necessary to permanently attach the photosensitive device 10 to the base 50.

As is well known to those skilled in the art, photosensitive or light emitting components can be attached to connectors with epoxy. However, with components in which proper alignment is extremely critical, it is very difficult to maintain the proper positions of the elements shown in FIG. 5B for the extended duration required for epoxy to cure and harden. The complicated procedures necessary to hold these elements rigidly with respect to each other during this extended time could significantly increase the cost of manufacturing the connector. In addition, epoxies typically exhibit contraction during their curing cycle. Any contraction of an epoxy would disadvantageously change the position of the lens 22 with respect to the core 16 and adversely affect the alignment achieved.

The problems described above can be solved if the photosensitive device 10 is welded to the base immediately after alignment is achieved. However, welding is difficult to achieve between a component, such as the housing 20, that is made of Kovar or stainless steel to another component, such as base 50, which is made of cast zinc material. These metals are not compatible and are not amenable to welding. One solution could be to manufacture the base 50 from a material that is compatible with Kovar or stainless steel. However, manufacturing the base 50 of stainless steel effectively prevents its being cast in its final shape and therefore mandates expensive machining operations. Therefore, an advantage of the present invention is that it provides an adapter 66 which can be rigidly attached to the base 50 while also being compatible for welding to the alignment member 34. The interference fit between the cylindrical portion of the adapter and the opening in the base permits a rigid and permanent attachment of these two components without the concern about compatibility between their respective materials.

Figure 6:
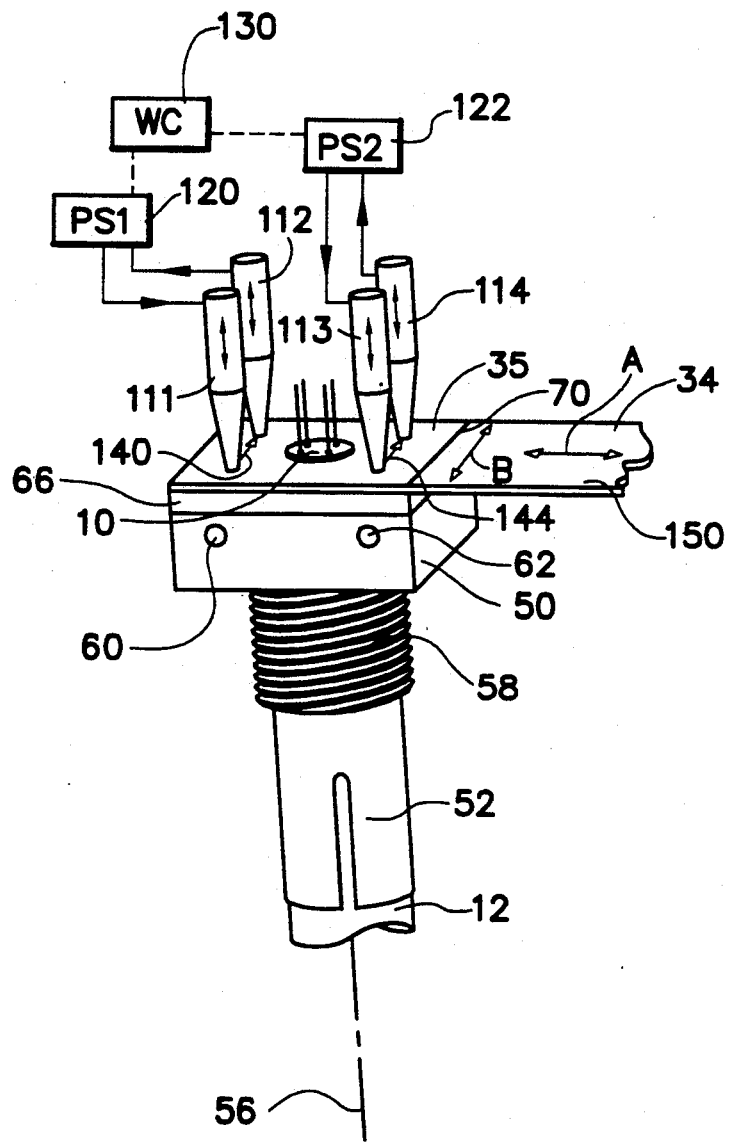
FIG. 6 illustrates a preferred method of manufacturing the present invention.

The present invention is constructed to permit its manufacture in a way that quickly attaches the elements together permanently immediately following the achievement of proper alignment during the active alignment procedure. FIG. 6 illustrates a manufacturing process that is facilitated by the present invention.

In FIG. 6, the preferred embodiment of the present invention is illustrated with the portion 35 of the alignment member 34 being disposed in contact with the adapter 66, but not yet rigidly attached to the adapter. In other words, the alignment member 34 can be moved in the directions indicated by arrows A and B to result in movement of the photosensitive device 10 within the second opening 98 and in relation to the axis 56. The present invention can be manufactured in association with a machine that disposes four welding probes, 111–114, in contact with the upper surface of portion 35. It should be understood that the downward force of the probes against the upper surface of the alignment member 34 is not sufficient to prevent its movement in the directions indicated by arrows A and B. This permits the alignment member 34 to slide along the upper surface of adapter 66 under the tips of the probes during the active alignment process. When appropriate alignment of the PIN diode with axis 56 is achieved, an additional downward force by the probes, 111–114, can be achieved to firmly hold portion 35 of the alignment member 34 against the upper surface of adapter 66. After this additional downward force has been achieved, the portion 35 is resistance welded to the adapter 66 at the four locations where the probes contact the alignment member 34.

It has been experimentally determined that the resistance welding process can be significantly enhanced if a capacitively stored charge, rather than an AC current, is used to fuse the materials. Since very brief welding times are needed because of the size and conductivity of the materials involved, it has been found that the use of an AC current for this purpose is too unreliable because the time duration between a weld command and the actual attainment of sufficient current to achieve the weld is adversely affected by the short weld time requirements and the period of a sixty Hertz current waveform. Therefore, it has been determined that it is advantageous to utilize a stored capacitive charge and to discharge the current through the materials to be welded in response to a weld command signal.

It has also been determined that welding quality is enhanced if the four electrodes are connected in the manner shown in FIG. 6. A first power supply 120 and a second power supply 122, identified as PS1 and PS2, are connected to a welding controller 130. The first power supply 120 is connected as schematically shown in FIG. 6 to electrodes 111 and 112. When activated by the welding controller 130, the first power supply 120 discharges a current through electrode 111 toward the portion 35 of the alignment member 34. The current flows through portion 35 and into the adapter 66. As is well known by those skilled in the art, the coplaner interface between portion 35 and adapter 66 exhibits a higher resistance than either of those two elements alone. This higher resistance at the interface creates a resistance weld. The current flows through adapter 66 as indicated by dashed arrow 140 toward electrode 112. The current passes upward from the adapter 66 through portion 35 and through electrode 112 to return to the first power supply 120. The current path represented by electrodes 111 and 112 and by dashed line 140 causes the two welds under electrodes 111 and 112 to occur simultaneously. Similarly, when the second power supply 122 discharges its current through electrode 113, the current passes through portion 35 and adapter 66 to create a resistance weld beneath electrode 113. The current flows along dashed line 144 through adapter 66 and then upward toward electrode 114. This creates the second resistance weld below electrode 114 as the current returns to the second power supply 122. This procedure assures that the two resistance welds below electrodes 113 and 114 are made simultaneously. The first and second power supplies are controlled by the welding controller 130 to cause them to discharge their currents at the same time. The four resistance welds that result from the procedure described above firmly and permanently attached portion 35 to adapter 66. This results in the permanent alignment of the PIN diode with axis 56.

Figure 7:
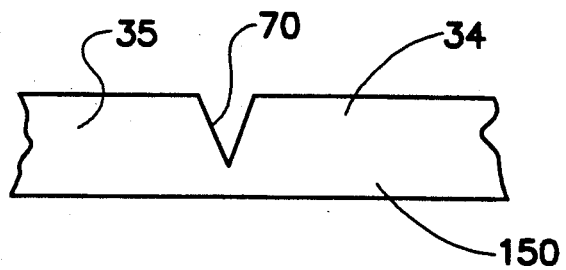
FIG. 7 shows a sectioned view of a notch in a the alignment member in the present invention.

After the permanent attachment of the photosensitive device 10 to the base 50, the extension portion 150 of alignment member 34 can be removed by frangibly disconnecting it from portion 35 at line 70. FIG. 7 is an enlarged view of the frangible connection between portion 35 and the removable portion 150. A V-shaped groove extending through approximately seventy percent of the thickness of the alignment member 34 serves this purpose adequately. After the removable portion 150 is disconnected along line 70 from portion 35, the device shown in FIG. 2 and described above is achieved.

Although the present invention has been described with significant specificity and illustrated to show a particular embodiment thereof, along with a particular method for manufacturing that embodiment, it should be clearly understood that alternative embodiments of the present invention are possible within its scope. In addition, specific materials are discussed in the description of the preferred embodiment although it should be understood that other materials could alternatively be used in the present invention. Furthermore, although a particular resistance welding procedure has been described for the purpose of manufacturing the present invention, alternative procedures could also be used. Throughout the description of the preferred embodiment, the present invention has been described in terms of the connection of a photosensitive device in association with an optical fiber. However, it should clearly be understood that an alternative embodiment of the present invention could connect a light emitting device in association with an optical fiber. Virtually any photoelectric device could be actively aligned with an optical fiber or an alternative light transmissive media using the concepts and structures of the present invention.

The embodiments of the invention in which an exclusive property or right is claimed are defined as follows:

1. An optically aligned connector, comprising:
   a base having a first portion and a second portion, said first portion being shaped to receive an end of an optical fiber in a fixed position therein aligned with a predetermined axis, said second portion having a first opening in a first surface thereof, said opening and said first portion being on opposite sides of said base from said second portion;
   an adapter having a first plate portion disposed in parallel association with said first surface and being firmly attached to said second portion;
   an alignment member having a second plate portion with a second opening therethrough; and a photoelectric device rigidly attached to said alignment member and disposed in said second opening, said alignment member being attached to said adapter with said photoelectric device being disposed at a prealigned position relative to said axis.

2. The connector of claim 1, wherein:
said photoelectric device comprises a PIN diode.

3. The connector of claim 1, wherein:
said base is made of a cast zinc material.

4. The connector of claim 1, wherein:
said adapter comprises a cylindrical element extending from said first plate portion, said cylindrical element being shaped to be received in interfering relation within said first opening, said cylindrical element being shaped to receive said photoelectric device in clearance relation therein.

5. The connector of claim 1, wherein:
said adapter is made of KOVAR.

6. The connector of claim 1, wherein:
said adapter is made of stainless steel.

7. The connector of claim 1, further comprising:
an extension member frangibly attached to said alignment member.

8. The connector of claim 1, wherein:
said first surface is a machined surface.

9. An optoelectronic connector, comprising:
a base;
means for holding an end of an optical fiber in a fixed position relative to said base with said end being in coaxial relation with an axis;
a first opening formed in a first surface of said base, said axis extending through said first opening;
an adapter plate attached to said first surface, said adapter having a second opening therein, said axis extending through said second opening; and
means for rigidly disposing a photoelectric device within said first opening with a photoelectric element of said photosensitive device disposed at a predefined position relative to said axis.

10. The connector of claim 9, wherein:
said disposing means comprises an alignment plate attached to said adapter plate, said alignment plate being said photoelectric device attached thereto.

11. The connector of claim 10, wherein:
said adapter plate has protrusion extending therefrom, said protrusion being disposed in interference relation within said first opening.

12. The connector of claim 11, further comprising:
an extension member frangibly attached to said alignment plate.

13. The connector of claim 10, wherein:
said alignment plate is resistance welded to said adapter plate.

14. The connector of claim 13, wherein:
said base is made of a cast zinc material.

15. The connector of claim 13, wherein:
said adapter plate and said alignment plate are made of KOVAR.

16. An optoelectronic connector, comprising:
means for providing a base;
means for holding an end of an optical fiber in a fixed position relative to said base with said end being aligned in coaxial relation with an axis;
means for providing a space within said base formed in a first surface of said base; and
means for attaching an adapter plate to said base; and
means for disposing a photosensitive device within an opening at a preselected position relative to said axis.

17. A method for connecting a photosensitive device in alignment with an optical fiber, comprising:
providing a base;
holding an end of an optical fiber in a fixed position relative to said base with said end being aligned in coaxial relation with an axis;
providing a space within said base formed in a first surface of said base; and
attaching an adapter plate to said base; and
disposing a photosensitive device within an opening at a preselected position relative to said axis.

* * * * *